(12) United States Patent
Asthana et al.

(10) Patent No.: US 10,742,749 B2
(45) Date of Patent: Aug. 11, 2020

(54) MEDIA HOTSPOT PAYOFFS WITH ALTERNATIVES LISTS

(71) Applicant: Hewlett-Packard Development Company, L.P., Houston, TX (US)

(72) Inventors: Prashant Asthana, Bangalore (IN); Sriganesh Madhvanath, Bangalore (IN); Sabrina Kwan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 557 days.

(21) Appl. No.: 15/521,873

(22) PCT Filed: Dec. 22, 2014

(86) PCT No.: PCT/US2014/071865
§ 371 (c)(1),
(2) Date: Apr. 25, 2017

(87) PCT Pub. No.: WO2016/025015
PCT Pub. Date: Feb. 18, 2016

(65) Prior Publication Data
US 2018/0219957 A1     Aug. 2, 2018

(30) Foreign Application Priority Data

Nov. 8, 2014   (IN) .......................... 5632/CHE/2014

(51) Int. Cl.
*H04L 29/08* (2006.01)
*G06F 16/951* (2019.01)
(Continued)

(52) U.S. Cl.
CPC ............ *H04L 67/16* (2013.01); *G06F 16/951* (2019.01); *H04L 67/1097* (2013.01);
(Continued)

(58) Field of Classification Search
CPC ..... H04L 67/1097; H04L 67/16; H04L 67/18; H04L 67/24; G06F 3/0482; G06F 3/0484;
(Continued)

(56) References Cited

U.S. PATENT DOCUMENTS

| 8,015,183 B2 | 9/2011 | Frank et al. |
| 8,023,691 B2 | 9/2011 | Rodriguez et al. |

(Continued)

FOREIGN PATENT DOCUMENTS

| EP | 2482210 A2 | 8/2012 |
| KR | 20100013038 A | 2/2010 |

(Continued)

OTHER PUBLICATIONS

Bulterman, et al. "Structured Multimedia Authoring", http://pdf. aminer/org/, 2005 ~ 25 pages.

(Continued)

*Primary Examiner* — Jungwon Chang
(74) *Attorney, Agent, or Firm* — HP Inc, Patent Department

(57) ABSTRACT

In one example of the disclosure, establishment data for a plurality of hotspots is accessed, with each hotspot being linked to a hotspot payoff. Presence data indicative of a mobile device detecting a target hotspot is received via a network. An alternatives list for the target hotspot is determined based on an identification of the target hotspot and the establishment data. The hotspot payoff is caused to be sent to the mobile device for display, the payoff including the alternatives list.

15 Claims, 9 Drawing Sheets

(51) Int. Cl.
*H04W 4/029* (2018.01)
*H04W 48/18* (2009.01)
*H04W 84/12* (2009.01)

(52) U.S. Cl.
CPC .............. *H04L 67/18* (2013.01); *H04L 67/24* (2013.01); *H04W 4/029* (2018.02); *H04W 48/18* (2013.01); *H04W 84/12* (2013.01)

(58) Field of Classification Search
CPC .... G06F 3/04842; G06F 16/954; G06F 16/44; G06F 40/14; G06F 16/951; H04W 4/029; H04W 48/18; H04W 84/12
See application file for complete search history.

(56) References Cited

U.S. PATENT DOCUMENTS

| | | | |
|---|---|---|---|
| 8,090,146 B2 | 1/2012 | Seshadri et al. | |
| 8,180,844 B1 | 5/2012 | Rhoads et al. | |
| 8,447,144 B2 | 5/2013 | King et al. | |
| 8,573,475 B2 | 11/2013 | Zuleeg | |
| 8,606,493 B1 | 12/2013 | Gold et al. | |
| 8,611,919 B2 | 12/2013 | Barnes, Jr. | |
| 2004/0103426 A1* | 5/2004 | Ludvig | H04H 20/86 725/9 |
| 2005/0224571 A1 | 10/2005 | Kelley et al. | |
| 2006/0168300 A1 | 7/2006 | An et al. | |
| 2007/0059674 A1 | 3/2007 | Takano et al. | |
| 2007/0279711 A1 | 12/2007 | King et al. | |
| 2008/0093460 A1 | 4/2008 | Frantz et al. | |
| 2009/0019061 A1 | 1/2009 | Scannell | |
| 2009/0077503 A1* | 3/2009 | Sundstrom | G06F 3/04842 715/856 |
| 2009/0262946 A1 | 10/2009 | Dunko | |
| 2009/0300498 A1* | 12/2009 | Falchuk | G06F 16/44 715/719 |
| 2012/0181330 A1 | 7/2012 | Kim | |
| 2012/0205439 A1 | 8/2012 | Frad et al. | |
| 2012/0234907 A1 | 9/2012 | Clark et al. | |
| 2012/0278242 A1 | 11/2012 | Griffith | |
| 2012/0278721 A1 | 11/2012 | Beidel | |
| 2013/0031593 A1 | 1/2013 | Booth | |
| 2013/0098990 A1 | 4/2013 | Cameron et al. | |
| 2013/0110814 A1* | 5/2013 | Mohapatra | G06F 16/954 707/710 |
| 2013/0112760 A1 | 5/2013 | Schory et al. | |
| 2013/0185657 A1 | 7/2013 | Gunawardena et al. | |
| 2013/0339857 A1* | 12/2013 | Garcia Bailo | G06F 3/0484 715/723 |
| 2014/0040070 A1* | 2/2014 | Pereymer | G06F 40/14 705/26.8 |
| 2014/0143835 A1* | 5/2014 | Brennan | G06F 17/217 726/4 |
| 2014/0372943 A1* | 12/2014 | Kroupa | G06F 3/0482 715/808 |

FOREIGN PATENT DOCUMENTS

| | | |
|---|---|---|
| WO | WO-2013158406 A2 | 10/2013 |
| WO | WO-2014024197 A1 | 2/2014 |
| WO | WO-2014087415 | 6/2014 |
| WO | WO-2015152951 | 10/2015 |

OTHER PUBLICATIONS

Chen, "Quicktime VR—An Image-based Approach to Virtual Environment Navigation", <http://www.cs.columbia.edu, 1995 ~ 10 pages.

Knight, "Virtual Software in Reality", < http://etheses.dur.ac.uk/, 2000 ~ 205 pages ~ Durham University.

Muller, E.I., Scan Anything and Let Your Phone Do the Rest, (Web Page), Oct. 25, 2011, 3 pages http://www.technologyreview.com/.

Ricoh. Clickable Paper. Oct. 13, 2014. <http://web.archive.org/web/ ~ 6 pages.

Scanlife, "Analytics Engine," Jan 8, 2014, <http://www.scanlife.com/analytics-engine>, 2 pages.

Scanlife, "Code Actions," Jan 8, 2014, <http://www.scanlife.com/code-actions>, 3 pages.

Scanlife, "Helping Marketers Deiiver Mobile Engagement with QR Codes on Steroids," Jan. 24, 2013, <http://www.scanlife.com/blog/2013/ ~ 3 pages.

Scanlife, "QR Code Generation Pricing Plans: Enterprise" Jan. 8, 2014, <http://www.scanlife.com ~ 3 pages.

Scanlife, "ScanLife QR Code Creation Plans," Jan 8, 2014, <http://www.scanlife.com/pricing>, 2 pages.

TechSmith.com, "Add Interactive Hotspots to Your Video," (Web page), Jun. 9, 2014 ~ http://www.techsmith.com/ ~ 5 pages.

* cited by examiner

| Hotspot ID | Location | Creator ID | Creation Time | Subject | Language | Geo Location | Content Type | Payoff ID |
|---|---|---|---|---|---|---|---|---|
| 1 | CtrX=200, CtrY=800 | Alice | 2013-11-30 05:15 IST | Theft and Vandalism | Japanese | France | Audio | 125001 |
| 2 | CtrX=600, CtrY=100 | Bob | 2014-05-30 02:20 IST | Conservation | English | United Kingdom | Text | 125002 |
| 3 | CtrX=500, CtrY=500 | Rajesh | 2014-05-30 02:20 IST | Value | Hindi | India | Video | 125004 |
| 4 | CtrX=500, CtrY=400 | Prashant | 2014-05-30 02:42 IST | Florence, Italy | English | India | URL | 125006 |
| 5 | CtrX=200, CtrY=650 | Sabrina | 2013-03-03 12:20 PT | The Louvre | Spanish | US | URL | 125007 |
| 6 | CtrX=850, CtrY=440 | Alice | 2013-03-05 4:20 PT | Shopping | French | US | Notification | 125008 |
| ... | | | | | | | | |

FIG. 7

MEDIA HOTSPOT PAYOFFS WITH ALTERNATIVES LISTS

BACKGROUND

A paper document or other physical medium can be inconspicuously linked to a digital content item. In an example, the medium may include an image that is machine-readable to obtain information relative to the medium.

DRAWINGS

Figures 6A, 6B:
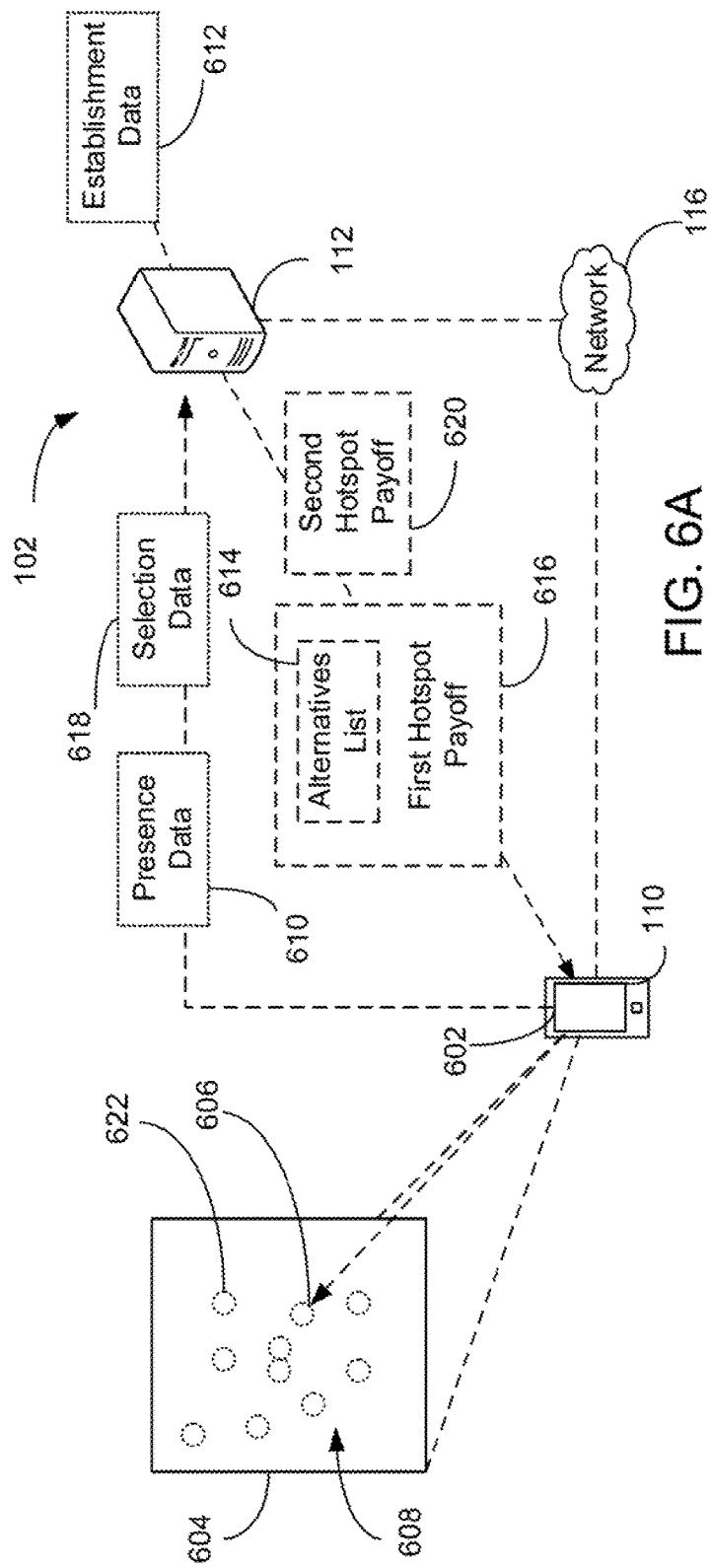

FIGS. 6A, 6B, and 7 illustrate an example of enabling media hotspot payoffs with alternatives lists based upon target hotspots and establishment data.

Figure 8:
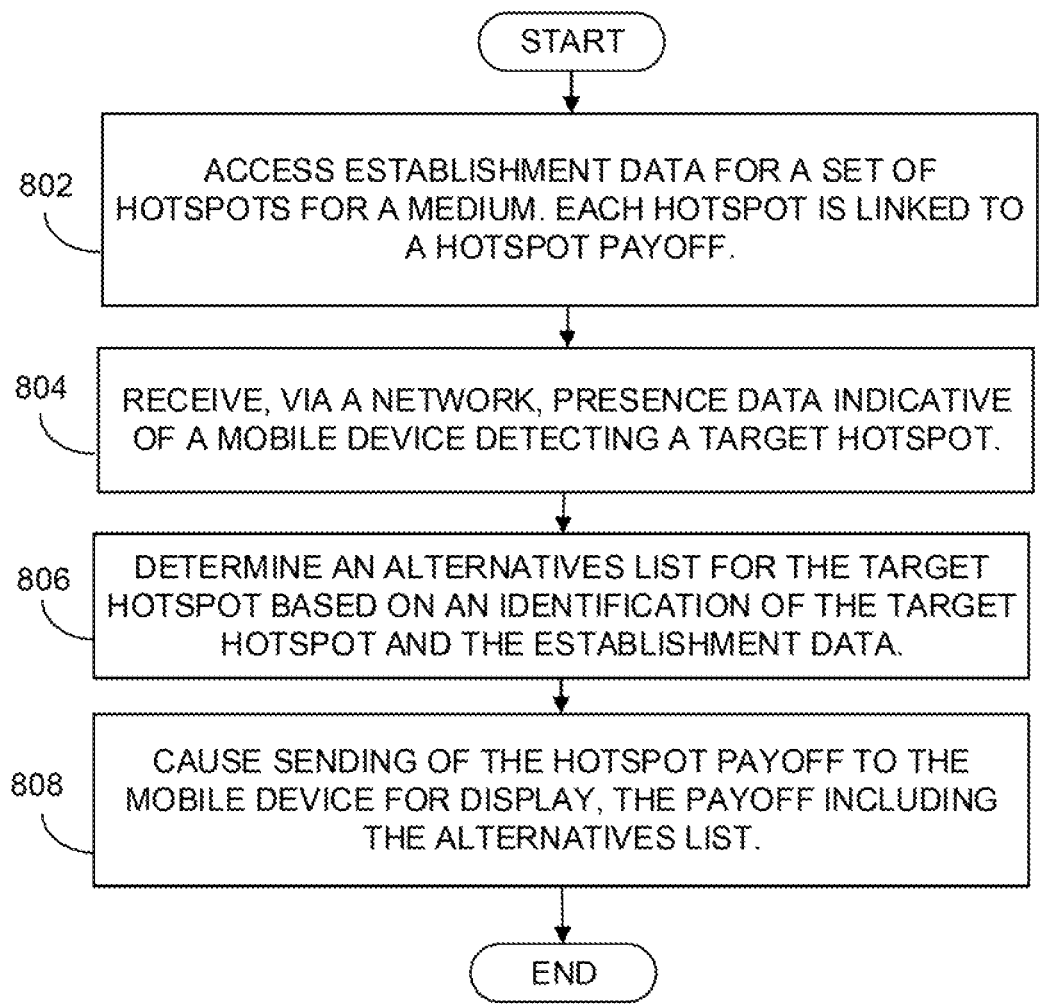

FIG. 8 is a flow diagram depicting steps taken to implement an example of provision to a mobile device of hotspot payoffs with alternatives lists determined based upon target hotspots and establishment data according to examples.

Figure 9:
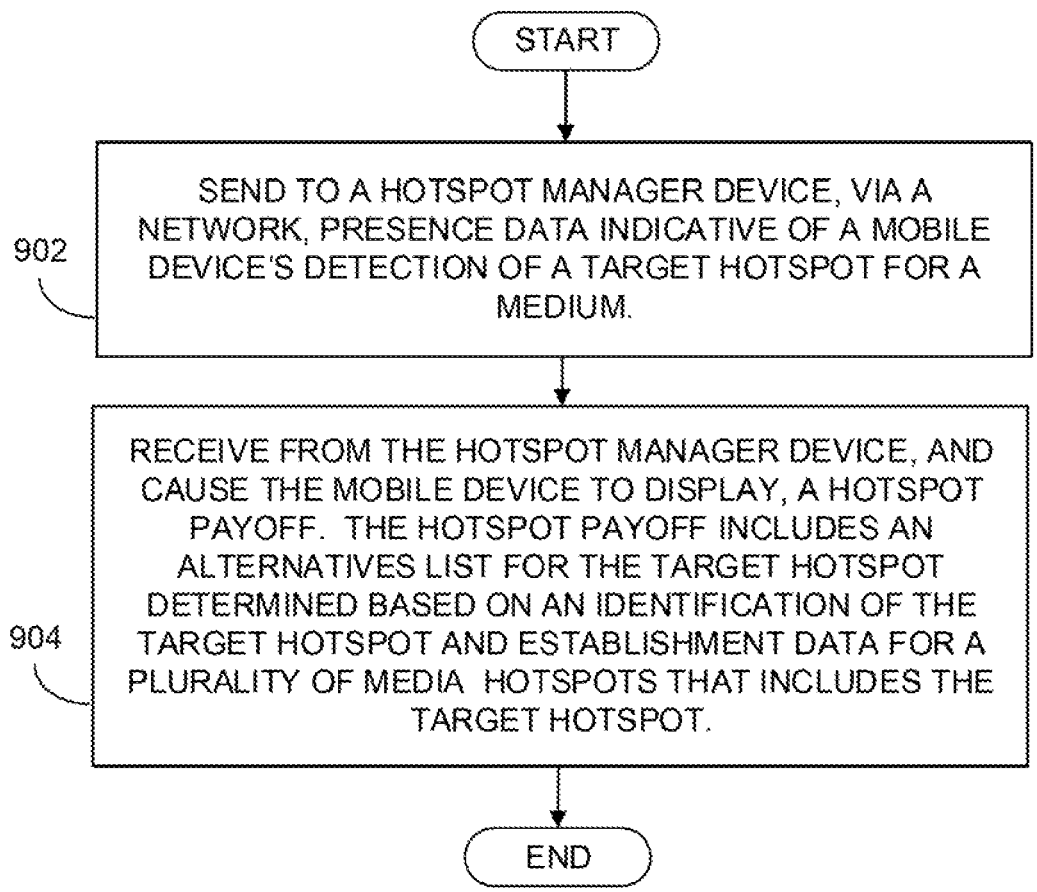

FIG. 9 is a flow diagram depicting steps taken to implement an example of sending of presence data to a hotspot manager device, and receiving hotspot payoffs with alternatives lists determined based upon target hotspots and establishment data according to examples.

DETAILED DESCRIPTION

Introduction:

Specific points or elements within media that trigger a providing of digital format information at a mobile device, following being scanned by a mobile device, are generally referred to herein as "hotspots" or "media hotspots." The terms "hotspots" and "media hotspots" are used synonymously in this application. Text, image, video, audio, or other digital format information provided in response to a mobile device detecting a hotspot is referred to generally herein as a "user experience payoff." For example, a magazine advertisement for a fashion collection may include images of fashion accessories, with each accessory image including a hotspot that, when scanned by a mobile device, triggers a providing of a user experience at the device. In examples, the user experience may be a display of text or video information regarding the accessory, or may be display of a web page or web application for ordering the accessory.

However, providing a cohesive and user experience via set of hotspots can be a difficult task for application developers. When the embedded hotspots are covert (e.g., invisible, or nearly invisible, to prevent defacing or detracting from media), a mobile device user may not be aware that the hotspots exist or that the associated payoffs are possible. In other situations, a mobile device user may be aware that hotspots exist, but is without knowledge of how to locate the hotspots and navigate between or among them to effect a payoff. In yet other situations, a user may be aware that hotspots exist, but may be overwhelmed as the number of hotspot options presented greatly outnumber the set of hotspots that the user has an interest in, or greatly outnumbers the amount of time available for the user to navigate hotspots within a medium. Further, in some applications, locations of hotspots may need to be modified after creation, or additional hotspots may need to be added over time, in order to maintain or improve the quality of the user experience. These hotspot modification and addition tasks can present further challenges to application developers.

To address these issues, various examples described in more detail below provide a system and a method to enable media hotspot payoffs with alternatives lists determined based upon target hotspots and establishment data. In an example of the disclosure, each hotspot for a medium, when detected by a mobile computing device having a camera, a display component, and programming to recognize the hotspot, is to trigger an information display relating to a subject of the medium at the display component. Establishment data for a plurality of hotspots for the medium is accessed. Each hotspot is linked to a hotspot payoff. Presence data is received via a network, the presence data indicative of a mobile device detecting a target hotspot. An alternatives list for the target hotspot is determined based on an identification of the target hotspot and the establishment data. The hotspot payoff, including the alternatives list, is caused to be sent to the mobile device for display. In an example, data indicative of a user selection from the alternatives list provided with the hotspot payoff is received via the network. The user selection was made at the mobile device. A new hotspot payoff that corresponds with the user selection is then sent to the mobile device.

In an example, the accessed establishment data may be metadata or other data that identifies a user-creator for the target hotspot. In this example, the alternatives list is user-searchable at the mobile device to access an additional hotspot created by the user creator. In another example, the accessed establishment data may be metadata or other data that identifies a creation time for the target hotspot. In this example, the alternatives list is user-searchable at the mobile device to access an additional hotspot that was created within a prescribed period relative to the creation time. In yet another example, the accessed establishment data may be metadata or other data that identifies a content type for the target hotspot. In this example, the alternatives list is user-searchable at the device to access an additional hotspot of the content type.

In other examples, the alternatives list may be updated with an additional hotspot identified according to the establishment data. In an example, the alternatives list may be updated to add an additional hotspot according to a shared establishment data attribute relative to the target hotspot. In a particular example, a user creator for the target hotspot may be identified, and the alternatives list is updated by adding additional hotspots created by the user creator. In another example, a creation time for the target hotspot may be identified, and the alternatives list is updated by adding additional hotspots created within a prescribed period relative to the creation time. In yet another example, a content type for the target hotspot may be identified, and the alternatives list is updated by adding additional hotspots of the content type.

In another example of the disclosure, presence data indicative of a mobile device's detection of a target hotspot for a medium is sent, via a network, from the mobile device to a hotspot manager device. The mobile device receives from the manager device a hotspot payoff including an alternatives list for the target hotspot. The alternatives list is a list determined based on identification of the target hotspot and establishment data for a plurality of media hotspots. The mobile device is in turn caused to display the hotspot payoff including the alternatives list.

In this manner, examples described herein may enable multiple hotspots of a printed document or other medium to be linked individually to be linked to different payoffs and to each other. Disclosed examples present an automated and efficient manner for recommendation of sending of a hotspot alternatives list to a mobile device based upon establishment data for the hotspots, thereby enhancing the user experience as hotspots are accessed and displayed at the mobile device. Disclosed examples additionally present an automated and efficient manner for hotspots to be modified, and/or or added, over time based on the establishment data for the hotspots.

Thus, user satisfaction with hotspot provision and management services that that incorporate the examples described herein should increase. Likewise, user satisfaction with mobile computing devices, software applications, and media with hotspots that are utilized with the hotspot provision and management services provided in accordance with the disclosed examples should increase.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of enabling media hotspot payoffs with alternatives lists. The fourth section, labeled "Operation," describes steps taken to implement various examples.

Figure 1:
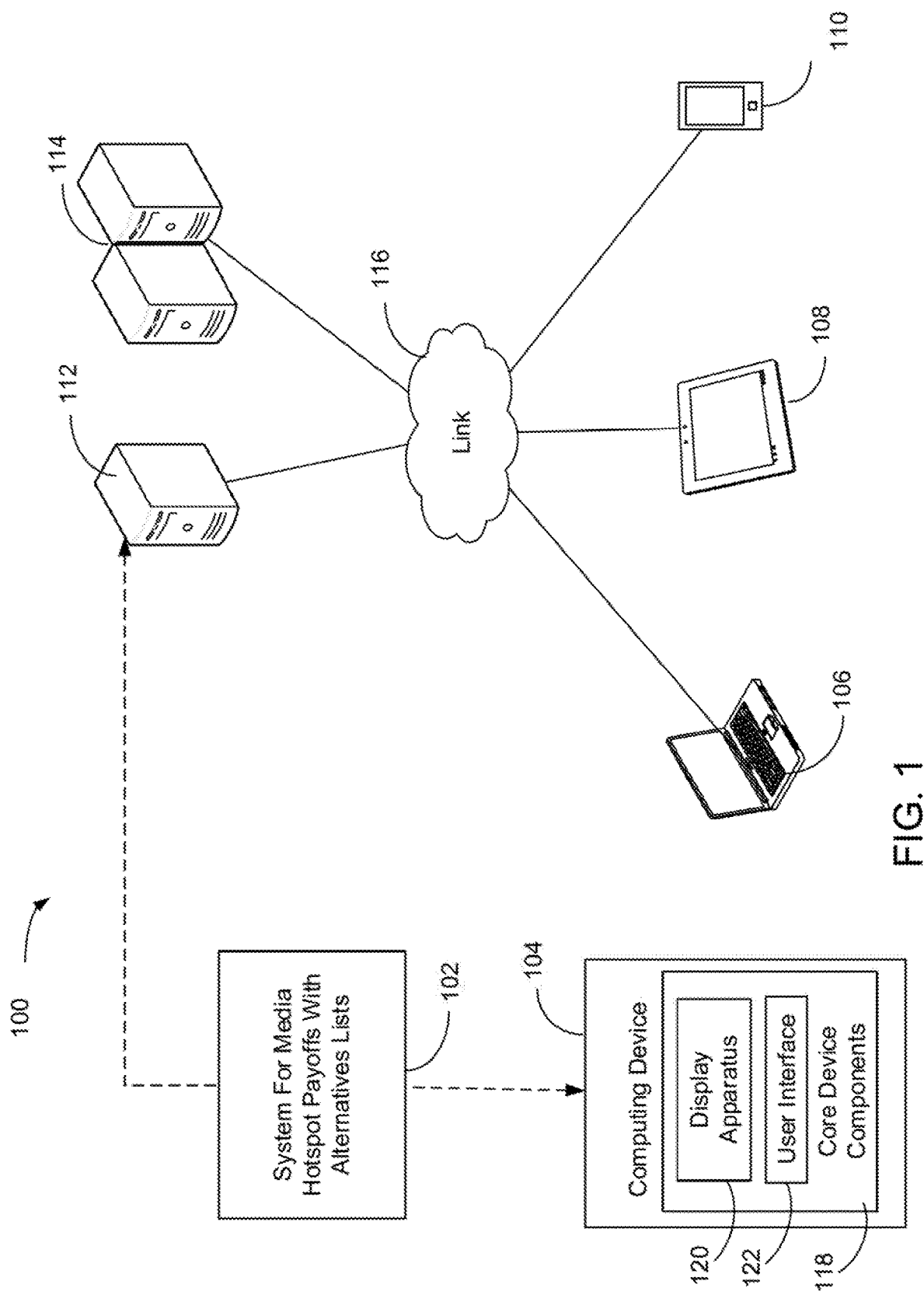
FIG. 1 is a block diagram depicting an example environment in which various examples of enabling media hotspot payoffs with alternatives lists may be implemented.

Environment:

FIG. 1 depicts an example environment 100 in which examples may be implemented as a system 102 for enabling media hotspot payoffs with alternatives lists based upon target hotspots and establishment data. Environment 100 is shown to include computing device 104, client devices 106, 108, and 110, server device 112, and server devices 114. Components 104-114 are interconnected via link 116.

Link 116 represents generally any infrastructure or combination of infrastructures to enable an electronic connection, wireless connection, other connection, or combination thereof, to enable data communication between components 104, 106, 108, 110, 112, and 114. Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, e.g., between two computing devices, that are connected by an electrical conductor A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112, and/or server devices 114 via link 116. Server device 112 represents generally any computing device to serve an application and corresponding data for consumption by components 104-110. Server devices 114 represent generally a group of computing devices collectively to serve an application and corresponding data for consumption by components 104-110.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

Figure 2:
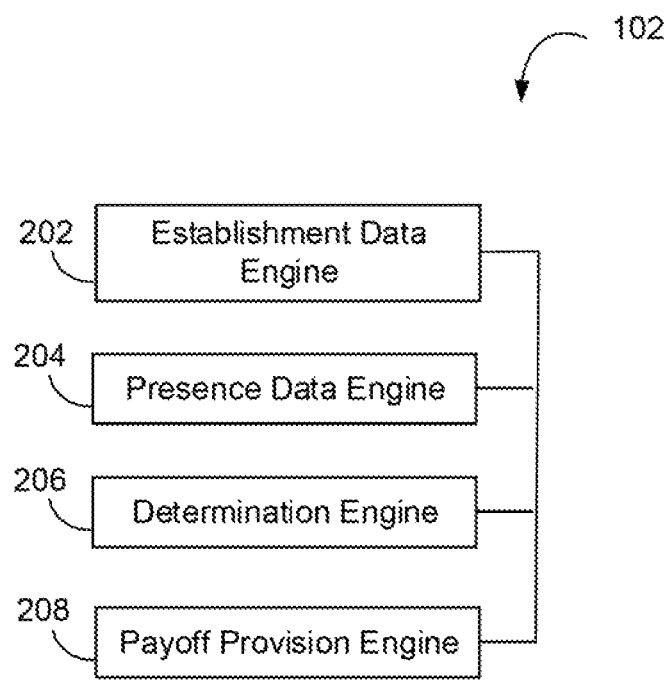
FIG. 2 is a block diagram depicting an example of a system enabling provision to a mobile computing device of media hotspot payoffs with alternatives lists.
Figure 3:
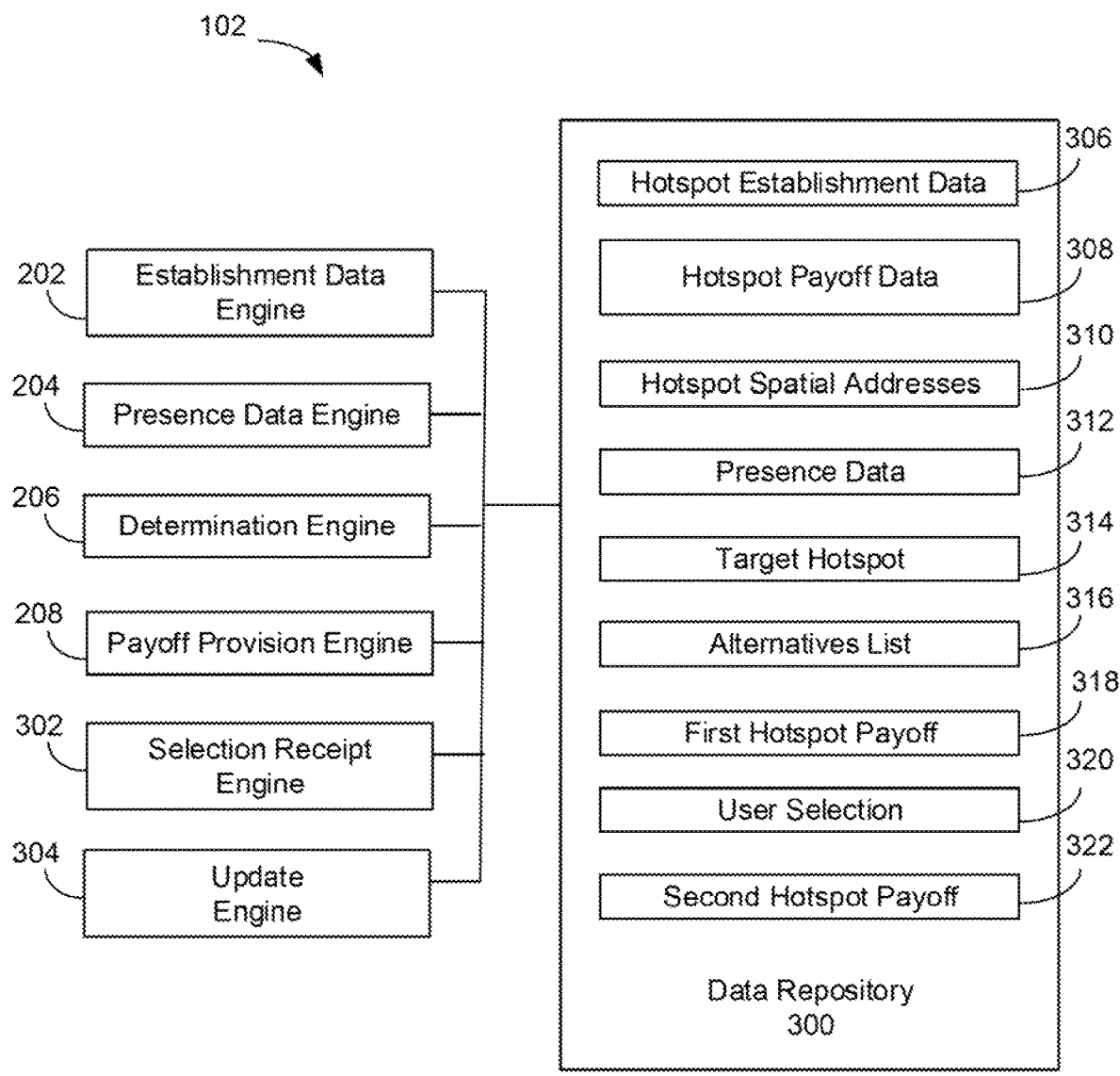
FIG. 3 is a block diagram depicting an example data structure for a system to enable media hotspot payoffs with alternatives lists.
Figure 4:
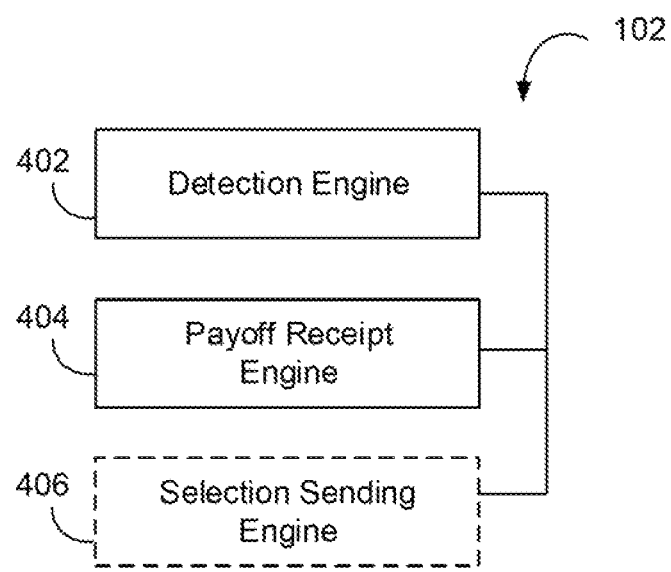
FIG. 4 is a block diagram depicting an example of a system enabling receipt at a mobile computing device of media hotspot payoffs with alternatives lists.

Components:

FIGS. 2-4, 5A, and 5B depict examples of physical and logical components for implementing various examples. In FIGS. 2-4 various components are identified as engines 202, 204, 206, 208, 302, 304, 402, 404, and 406. In describing engines 202, 204, 206, 208, 302, 304, 402, 404, and 406 focus is on each engine's designated function. However, the term engine, as used herein, refers generally to a combination of hardware and programming to perform a designated function. As is illustrated later with respect to FIGS. 5A and 5B, the hardware of each engine, for example, may include one or both of a processor and a memory, while the programming may be code stored on that memory and executable by the processor to perform the designated function.

System 102, discussed in more detail below, represents generally a combination of hardware and programming to enable media hotspot payoffs with alternatives lists based upon target hotspot and establishment data. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. For example, components that implement accessing establishment data for a plurality of media hotspots, receiving presence data indicative of a mobile device's detection of a target hotspot, and determination of an alternatives list for the target hotspot based on an identification of the target hotspot and the establishment data may be included within computing device 104. Continuing with this example, components that implement causing sending of the hotspot payoff with the alternatives list to the mobile device for display may be components included within a server device 112.

Other distributions of system 102 across computing device 104, client devices 106-110, server device 112, and server devices 114 are possible and contemplated by this disclosure. It is noted that all or portions of system 182 to enable media hotspot payoffs with alternatives lists may also be included on client devices 106, 108 or 110. For instance, components that implement sending of presence data indicative of the mobile device's detection of a target hotspot for a medium to a hotspot manager device, and implement receiving from the hotspot manager device, and causing the mobile device to display, a hotspot payoff including an alternatives list (determined in view of the target hotspot and establishment data) may be components included within mobile client devices 106, 108 or 110.

FIG. 2 is a block diagram depicting components of a system 102 to enable media hotspot payoffs with alternatives lists. In this example, system 102 includes establishment data engine 202, presence data engine 204, determination engine 206, and payoff provision engine 208. In performing their respective functions, engines 202, 204, 206, and 208 may access a data repository 300 (FIG. 3). Repository 300 (FIG. 3) represents generally any memory accessible to system 102 that can be used to store and retrieve data.

In an example, establishment data engine 202 represents generally a combination of hardware and programming to access establishment data for a plurality of media hotspots, with each hotspot being linked to a hotspot payoff. As used herein, "establishment data" refers generally to data relating to a media hotspot, including but not limited to data relating to circumstances or details of authoring, creation, or content of the hotspot, which can be utilized to catalog, classify or categorize the hotspot. As used herein, a "hotspot payoff" or "user experience payoff" refers generally to text, image, video, audio, or other digital format information provided to a mobile device for display in response to a trigger of the mobile device having scanned or otherwise detected a media hotspot. In examples, a media hotspot may, or may not, include a spatial address relative to a medium. In some examples, wherein each of the plurality of hotspots includes a spatial address relative to the medium, and each hotspot is linked to a hotspot payoff according to the spatial address. As used herein, a "spatial address" refers generally to an address or other identifier of a location that can be used to specify a location within a medium, or across multiple media (e.g., images or media). In an example, the spatial address may be in the form of an "(x, y)" coordinate relative to a medium. In another example, the spatial address may be in the form of an abstract global position, e.g. a global positioning system ("GPS") coordinate. As used herein, a "medium" or "media" refers to any article or object upon which a printed image can be formed, including, but not limited to, a printed medium in sheet or roll form.

Presence data engine 204 represents generally a combination of hardware and programming to receive, via a network, presence data indicative of a mobile device detecting a target hotspot. As used herein, "presence data" refers generally to any data indicative of a mobile device detecting or having detected a target media hotspot. In a particular example, the received presence data may be data indicative of the mobile device causing a display of the target hotspot. As used herein, a "target media hotspot" or "target hotspot" refers generally to a hotspot that has been scanned or otherwise detected by a mobile device. As used herein, the terms "mobile computing device" and "mobile device" are used synonymously, and refer generally to any portable computing device including, but not limited to, a tablet computer, notebook computer, or smartphone.

Determination engine 206 represents generally a combination of hardware and programming to determine an alternatives list for the target hotspot based on an identification of the target hotspot and the establishment data. As used herein, an "alternatives list" refers generally to any inventory, catalog, register, directory or other list of other or alternative hotspots relative to a target hotspot. As used herein, "identification" of an object (e.g. a hotspot) or of data refers generally to any recognition, classification, naming, detection, or discovery of the object or data.

Payoff provision engine 206 represents generally a combination of hardware and programming to cause sending of the hotspot payoff to the mobile device for display, the payoff including the alternatives list. As used herein, "display" refers generally to an exhibition or presentation caused by a computer for the purpose of perception by a user. In an example, a display may be or include a GUI display to be presented at a mobile computer, e.g., via a monitor, touchscreen, or other electronic display device. In an example, the mobile device may include such an electronic display device. In another example, the mobile device may cause a display by sending data including instructions for display to a display device that is electronically or wirelessly connected to the mobile device.

FIG. 3 depicts an example implementation of data repository 300. In this example, data repository 300 includes data representative of a hotspot payoff 306, hotspot spatial addresses 310, presence data 312, and data representative of target hotspot 314, an alternatives list 316, a first hotspot payoff 318, a user selection 320, and a second hotspot payoff 322. Referring to FIG. 3 in view of FIG. 2, in one example, establishment data engine 202 accesses hotspot establishment data 306 for a set of media hotspots, with each hotspot being linked to a hotspot payoff included within the hotspot payoff data 308 and including a spatial address 310 relative to a medium. In this example, we can assume the medium is a printed image, e.g. a magazine page advertising a fashion collection and including media hotspots for linking different fashion accessories to different user experiences to be provided at a mobile device. In other examples, the medium may be any other article or object upon which a printed image can be formed.

Presence data engine 204 receives, via a network, presence data 312 indicative of a mobile device detecting a target hotspot 314 from among the set of hotspots. In an example, the mobile device detecting the hotspot includes a camera, a display component, and programming to recognize the hotspot, and upon detection of the hotspot an information display relating to a subject of the medium is triggered, the display at the display component.

Determination engine 206 determines an alternatives list 316 for the detected target hotspot 314 based on an identification of, the target hotspot 314 and establishment data for the target hotspot included within hotspot establishment data 306.

Payoff provision engine 208 incorporates into or includes the alternatives list 316 within a first hotspot payoff 318 associated with the target hotspot 314, and causes sending of the first hotspot payoff 318 to the mobile device for display.

In one example, the determination engine 206 may determine the alternatives list 316 based upon establishment data 306 that identifies a user creator for the target hotspot 314.

In this example, the alternatives list 316, when provided to the mobile device by the payoff provision engine 208, is user-searchable at the device to enable a device user at the mobile device to access a second hotspot from among the set of media hotspots that was created by the same user creator.

In another example, the determination engine 206 may determine, the alternatives list 316 based upon establishment data 306 that identifies a creation time for the target hotspot 314. In this example, the alternatives list 316, when provided to the mobile device by the payoff provision engine 208, is user-searchable at the device to enable a device user at the mobile device to access a second hotspot from among the set of media hotspots, that was created within a prescribed period (e.g., within a day, within a month, within a year) relative to the creation time.

In another example, the determination engine 206 may determine the alternatives list 316 based upon establishment data 306 that identifies a content type for the target hotspot. In this example, the alternatives list 316, when provided to the mobile device by the payoff provision engine 208, is user-searchable at the device to enable a device user at the mobile device to access a second hotspot, from among the set of media hotspots, of the content type.

Continuing with the example data repository 300 of FIG. 3, in particular examples system 102 may also include, in addition to establishment data engine 202, presence data engine 204, determination engine 206, and payoff provision engine 208 discussed with respect to FIG. 2 above, a selection receipt engine 302 or an update engine 304. In performing their respective functions, engines 302 and 304 may access data repository 300 (FIG. 3).

In an example, selection receipt engine 302 represents generally a combination of hardware and programming to receive, via the network by which the presence data 312 was received, a user selection 320 made from the alternatives list 316 and made by a device-user at the mobile device. In turn, in this example, the selection receipt engine 302 sends to the mobile device a second hotspot payoff 322 (in addition to the first hotspot payoff 318 previously sent by the payoff provision engine 208 to the mobile device), the second hotspot payoff 322 corresponding with the user selection 320 from the alternatives list 316.

In an example, update engine 304 represents generally a combination of hardware and programming to accomplish an automatic updating or refreshing of the alternatives list based upon establishment data. In one example, update engine 304 may identify a user creator for the target hotspot 314, and update the alternatives list 316 by modifying hotspots, or adding additional hotspots, also created by the identified user creator. In another example, update engine 304 may identify a creation time for the target hotspot 314, and update the alternatives list 316 by modifying hotspots, or adding additional hotspots, created within a prescribed period relative to the identified creation time. In yet another example, update engine 304 may identify a content type for the target hotspot 314, and update the alternatives list 316 by modifying hotspots, or adding additional hotspots, of the same content type.

FIG. 4 is a block diagram depicting components of another example of system 102 to enable media hotspot payoffs with alternatives lists. In this example, system 102 includes detection engine 402, and payoff receipt engine 404. In performing their respective functions, engines 402 and 404 may access a data repository such as data repository 300 (FIG. 3).

In an example, detection engine 402 represents generally combination of hardware and programming to send to presence data that is indicative of a mobile device's detection of a target hotspot for a medium to a hotspot manager device. As used herein, a "hotspot manager device" refers generally to any computing device that includes hardware and software configured to provide media hotspot payoffs with alternatives lists for display at the mobile device. In an example, the hotspot manager device includes hardware and software configured to access establishment data for a set of media hotspots (with each hotspot being linked to a hotspot payoff and including a spatial address relative to a medium), to receive via a network presence data indicative of a mobile device detecting a target hotspot, to determine an alternatives list for the target hotspot based on an identification of the target hotspot and the establishment data, and to cause sending of the hotspot payoff, the payoff including the alternatives list, to the mobile device for display. In a particular example, the presence data is data indicative of the mobile device having caused a display of the target hotspot.

In an example, payoff receipt engine 404 represents generally a combination of hardware and programming to receive from the hotspot manager device a hotspot payoff that includes an alternatives list. The alternatives list for the target hotspot is a list determined by the hotspot manager device based upon the manager device's identification of the target hotspot and identification of establishment data for the set of media hotspots that includes the target hotspot. Payoff receipt engine 404 additionally causes the mobile device to display the hotspot payoff with the alternatives list.

In an example, system 102 may, in addition to including detection engine 402 and payoff receipt engine 404, include a selection sending engine 406. In performing its function detection engine 406 may access a data repository 300, such as data repository 300 (FIG. 3). In an example, selection sending engine 406 represents generally a combination of hardware and programming to send selection data to the hotspot manager device. The selection data is data indicative of a device-user selection's from the alternatives list, wherein the selection is made at the mobile device. In a particular example, the selection data may be sent from the mobile device, via network, to the hotspot manager device. In this example, detection engine 406 is additionally to receive from the hotspot manager device, following sending of the selection data to the manager device, an additional hotspot payoff that corresponds with the device-user's selection from the displayed alternatives list.

In the foregoing discussion of FIGS. and 4, engines 202, 204, 206, 208, 302, 304, 402, 404, and 406 were described as combinations of hardware and programming. Engines 202, 204, 206, 208, 302, 304, 402, 404, and 406 may be implemented in a number of fashions. Looking at FIGS. 5A and 5B the programming may be processor executable instructions stored on a tangible memory resource 502 and the hardware may include a processing resource 504 for executing those instructions. Thus memory resource 502 can be said to store program instructions that when executed by processing resource 504 implement system 102 of FIGS. 2, 3, and 4.

Memory resource 502 represents generally any number of memory components capable of storing instructions that can be executed by processing resource 504. Memory resource 502 is non-transitory in the sense that it does not encompass a transitory signal but instead is made up of more or more memory components to store the relevant instructions. Memory resource 502 may be implemented in a single device or distributed across devices. Likewise, processing resource 504 represents any number of processors capable of executing instructions stored by memory resource 502.

Processing resource 504 may be, integrated in a single device or distributed across devices. Further, memory resource 502 may be fully or partially integrated in the same device as processing resource 504, or it may be separate but accessible to that device and processing resource 504.

In one example, the program instructions can be part of an installation package that when installed can be executed by processing resource 504 to implement system 102. In this case, memory resource 502 may be a portable medium such as a CD, DVD, or flash drive or a memory maintained by a server from which the installation package can be downloaded and installed. In another example, the program instructions may be part of an application or applications already installed. Here, memory resource 502 can include integrated memory such as a hard drive, solid state drive, or the like.

Figure 5A:
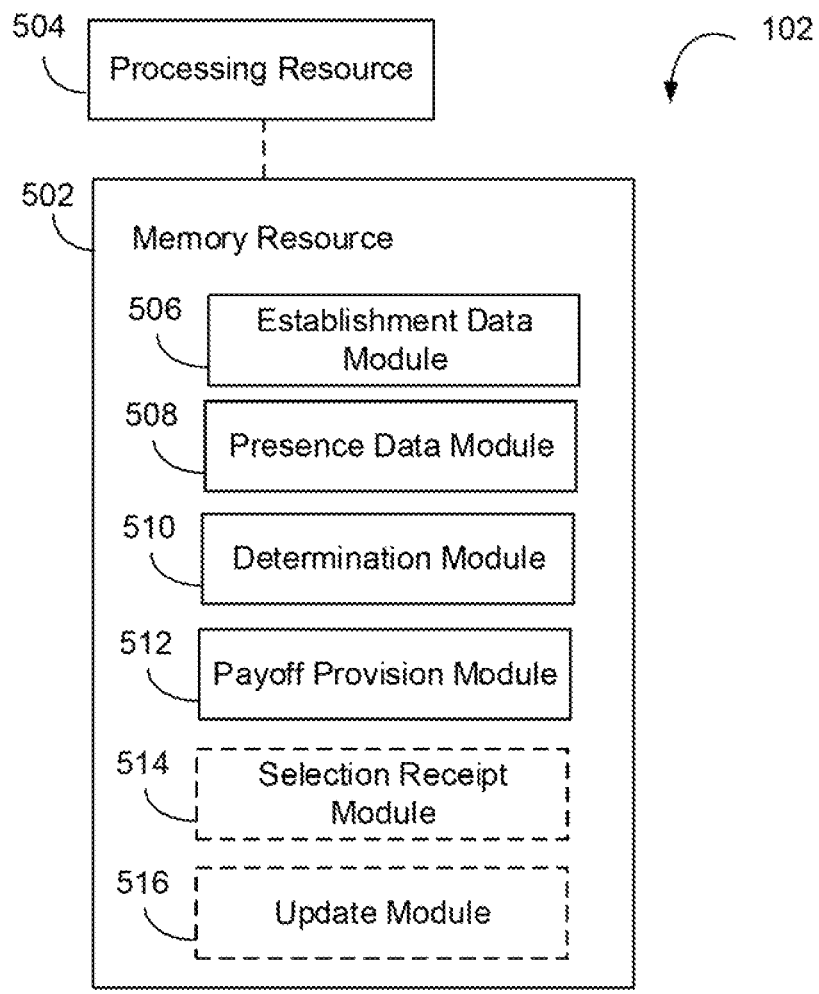
FIGS. 5A and 5B are block diagrams depicting a memory resource and a processing resource to implement an example of enabling of media hotspot payoffs with alternatives lists.

In FIG. 5A, the executable program instructions stored in memory resource 502 are depicted as establishment data module 506, presence data module 508, determination module 510, payoff provision module 512, selection receipt module 514, and update module 516. Establishment data module 506 represents program instructions that when executed by processing resource 504 may perform any of the functionalities described above in relation to establishment data engine 202 of FIG. 2. Presence data 508 represents program instructions that when executed by processing resource 504 may perform any of the functionalities described above in relation to presence data engine 204 of FIG. 2. Determination module 510 represents program instructions that when executed by processing resource 504 may perform any of the functionalities described above in relation to determination engine 206 of FIG. 2. Payoff provision module 512 represents program instructions that when executed by processing resource 504 may perform any of the functionalities described above in relation to payoff provision engine 208 of FIG. 2. Selection receipt module 514 represents program instructions that when executed by processing resource 504 may perform any of the functionalities described above in relation to selection receipt engine 302 of FIG. 3. Update module 516 represents program instructions that when executed by processing resource 504 may perform any of the functionalities described above in relation to update engine 304 of FIG. 3.

Figure 5B:
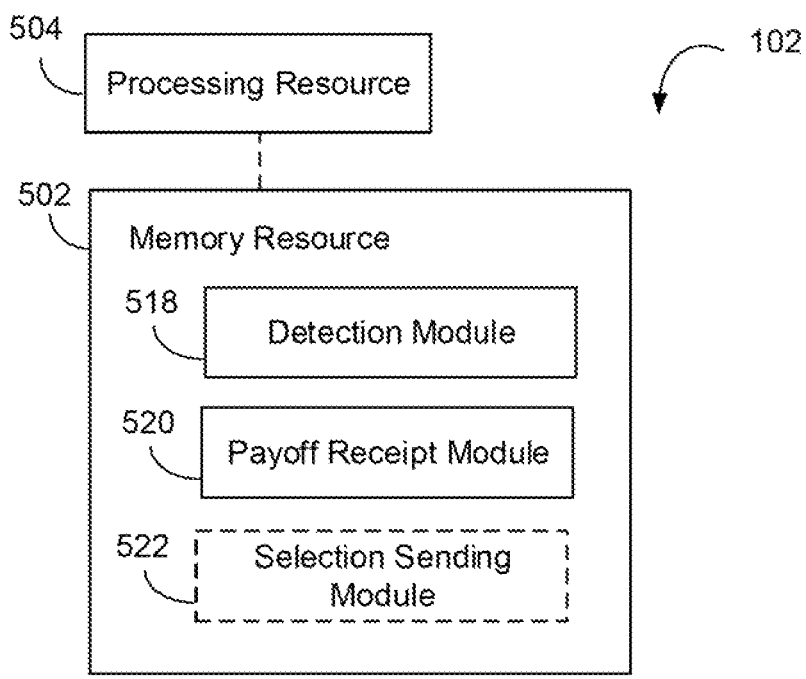

In FIG. 5B, the executable program instructions stored in memory resource 502 are depicted as detection module 518, payoff receipt module 520, and selection sending module 522. Detection module 518 represents program instructions that when executed by processing resource 504 may perform any of the functionalities described above in relation to detection engine 402 of FIG. 4. Payoff receipt module 520 represents program instructions that when executed by processing resource 504 may perform any of the functionalities described above in relation to payoff receipt engine of FIG. 4. Selection sending module 522 represents program instructions that when executed by processing resource 504 may perform any of the functionalities described above in relation to selection sending engine 406 of FIG. 4.

Illustrative Example

FIG. BA in view of FIGS. 6B and 7 illustrates an example of system 102 enabling provision of media hotspot payoffs with alternatives lists. Beginning at FIG. 6A, in an example, a user causes a smartphone mobile computing device 110 with a camera, a display component 602, and programming to be positioned over a medium 604, e.g., a paper or cardstock medium that is be a reproduction of the "Mona Lisa" painting, that includes a set of media hotspots 608. The user causes the smartphone 110 to be positioned such that the smartphone 110, utilizing the camera, scans the physical medium 604 to detect a first or "target" hotspot 606 among the set of hotspots 608, and thereby causes an information display at the display component 602 of the smartphone 110 relating to a subject of the medium 604, e.g. information relating to the painter Leonardo Da Vinci.

The smartphone 110 sends to a hotspot manager server 112, via a network 116, presence data 610 that is indicative of the smartphone's detection of the target hotspot 606. In this example the presence data 610 indicative of the smartphone's detection of the target hotspot may include a hotspot identifier name or number 610' (FIG. 6B) and/or a spatial address 610" (FIG. 6B) relative to the detected target hotspot 606.

Hotspot manager server 112 receives the presence data 610 indicative of the smartphone's detection of the target hotspot 606. The hotspot manager server 112 accesses establishment data 612 for the set of hotspots 608. In this example according to the establishment data 612 accessed by hotspot manager server 112, each hotspot among the set of hotspots 608 is linked to a hotspot payoff 702 (FIG. 7) and includes a spatial address 704 (FIG. 7) relative to the medium 604.

In examples, linkage of hotspots 608 to hotspot payoffs may be a linkage according to a name or number for the hotspot, e.g., a "Hotspot ID" 728 (e.g., a hotspot and hotspot payoff are linked in a database by virtue of the hotspot and the payoff each being associated, with a particular "Hotspot ID"). In other examples, linkage of hotspots 608 to hotspot payoffs may be a linkage according to a spatial address 704 (e.g., a hotspot and hotspot payoff are linked in a database by virtue of the hotspot and the payoff each being associated with a particular spatial address). Further, in this example, the establishment data 612 for each of the set of hotspots 603 identifies a user creator 706 (FIG. 7), a creation time 708 (FIG. 7), and a content type 710 (FIG. 7) for each of the set of hotspots, including the target hotspot 606. Establishment data 612 may also include other establishment attributes with respect to a hotspot, including, but not limited to, subject 712 (FIG. 7), language 714 (FIG. 7), and geographic location 716 (FIG. 7).

Continuing with the example of FIG. 6A in view of FIGS. 6B and 7, hotspot manager server 112 determines an alternatives list 614 for the target hotspot 606 based on an identification of the target hotspot 606 and the establishment data 612. In this example the target hotspot 606 is "Hotspot ID 3" (606, FIG. 7), and the determined alternatives list 614 may include, but is not limited to, information relative to media hotspots of the set 608, e.g., "Hotspot IDs 1-2" 718 (FIG. 7) and "Hotspot IDs 4-6" 720 (FIG. 7) The hotspot manager server 112 causes sending of a first hotspot payoff 616 (in this example, "Payoff ID 125004", 616 (FIG. 7)) that is associated with the target hotspot 606 to the smartphone 110 for display. The first hotspot payoff 616 that is sent to the smartphone 110 incorporates or otherwise includes the determined alternatives list 614.

Continuing with the example of FIG. 6A in view of FIGS. 6B and 7, a user at the smartphone 110 interacts with a display at the smartphone to cause sending to the hotspot manager server 112 of selection data 618 indicative of a user selection from the alternatives list 614 made at the smartphone 110. In examples, the alternatives list 614 is user-searchable at the smartphone 110 to access additional hotspots according a same or similar author as the author (706, FIG. 7) of the target hotspot 606, according to a prescribed or specified time frame (708, FIG. 7) relative to the date the target hotspot 606 was authored, or according a same or similar content type (710, FIG. 7) as that of the target hotspot 606. In this example, we can assume a user at the mobile device makes a user selection from the alternatives list that identifies a second hotspot 622 known as "Hotspot ID 6" (622, FIG. 7) that was authored by "Alice", has a creation time of "2013-03-05 4:20 PT", is of the content type "Shopping", is in the "French" language, was created in the "US", and is of type "Notification." The hotspot manager server 112 receives the selection data 618 via the network 116, and sends to the smartphone 110 a second hotspot payoff 620 (in this example, "Payoff ID 125008" 620, FIG. 7) that corresponds according to hotspot author ("Alice") with the user selection indicated by the selection data 618. The smartphone 110 receives the second hotspot payoff 620 from the hotspot manager server 112, and in turn causes the smartphone to display the second hotspot payoff 620.

Continuing with the example of FIG. 6A in view of FIGS. 6B and 7, in certain examples, the hotspot manager server 112 may perform an alternatives list update function by adding an additional hotspot according to a shared establishment data attribute relative to the target hotspot. In an example, the hotspot manager server 112 may perform the alternatives list update function by identifying a user creator "Rajesh" 722 for the target hotspot 606, and updating the alternatives list 614 with additional hotspots created by the user creator "Rajesh" 722. In another example, the hotspot manager server 112 may perform the alternatives list update function by identifying a creation time "2014-05-30 02:20 IST") 724 for the target hotspot 606, and updating the alternatives list 614 by adding additional hotspots created within a prescribed period relative to the creation time "2014-05-30 02:20 IST") 724. In yet another example, the hotspot manager server 112 may perform the alternatives list update function by identifying a content type "Notification" 726 for the target hotspot 606, updating the alternatives list 606 by adding additional hotspots of the "Notification" content type 726.

Operation:

FIG. 8 is a flow diagram of steps taken to implement a method for providing to a mobile device media hotspot payoffs with alternatives lists determined based upon target hotspots and establishment data. In discussing FIG. 8, reference may be made to the components depicted in FIGS. 2 and 5A. Such reference is made to provide contextual examples and not to limit the manner in which the method depicted by FIG. 8 may be implemented. Establishment data for a plurality of hotspots for a medium is accessed. Each hotspot is linked to a hotspot payoff (block 802). Referring back to FIGS. 2 and 5A, establishment data engine 202 (FIG. 2) or establishment data module 506 (FIG. 5A), when executed by processing resource 504, may be responsible for implementing block 802.

Presence data indicative of a mobile device detection of a target hotspot is received via a network (block 804). Referring back to FIGS. 2 and 5A, presence data engine 204 (FIG. 2) or presence data module 508 (FIG. 5A), when executed by processing resource 504, may be responsible for implementing block 804.

An alternatives list for the target hotspot is determined based on an identification of the target hotspot and the establishment data (block 806). Referring back to FIGS. 2 and 5A, determination engine 206 (FIG. 2) or determination module 510 (FIG. 5A), when executed by processing resource 504, may be responsible for implementing block 806.

The hotspot payoff is caused to be sent to the mobile device for display, with the payoff including the alternatives list (block 808). Referring back to FIGS. 2 and 5A, payoff provision engine 208 (FIG. 2) or payoff provision module 512 (FIG. 5A), when executed by processing resource 504, may be, responsible for implementing block 808.

FIG. 9 is a flow diagram of steps taken to implement a method for sending presence data to a hotspot manager device, and receiving hotspot payoffs with alternatives lists determined based upon target hotspots and establishment data. In discussing FIG. 9, reference may be made to the components depicted in FIGS. 4 and 5B. Such reference is made to provide contextual examples and not to limit the manner in which the method depicted by FIG. 9 may be implemented. Presence data indicative of a mobile device's detection of a target hotspot for a medium is sent to a hotspot manager device via a network (block 902). Referring back to FIGS. 4 and 5B, detection engine 402 (FIG. 4) or detection module 518 (FIG. 5B), when executed by processing resource 504, may be responsible for implementing block 902.

A hotspot payoff is received from the hotspot manager device, and is caused to be displayed at the mobile device. The hotspot payoff includes an alternatives list for the target hotspot that was determined, e.g., at the hotspot manager device, based on the hotspot manager device's identification of the target hotspot and establishment data for a set of media hotspots that includes the target hotspot (block 904). Referring back to FIGS. 4 and 5B, payoff receipt engine 404 (FIG. 4) or payoff receipt module 520 (FIG. 5B), when executed by processing resource 504, may be responsible for implementing block 904.

CONCLUSION

FIGS. 1-4, 5A, 5B, 6A, 6B, and 7-9 and in depicting the architecture, functionality, and operation of various examples. In particular, FIGS. 1-4, 5A, and 5B depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Examples can be realized in any memory resource for use by or in connection with processing resource A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 8 and 9 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been shown and described with reference to the foregoing examples. It is to be understood, however, that other forms, details and examples may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A memory resource storing instructions that when executed cause a processing resource to perform processing comprising:
   accessing establishment data for a plurality of hotspots that are available on a medium, with each hotspot being linked to a hotspot payoff including information that is presented responsive to detection of the hotspot;
   receiving, via a network, presence data indicative of a mobile device detecting a target hotspot of the hotspots that are available on the medium within the previously accessed establishment data;
   determining an alternatives list for the target hotspot based on an identification of the target hotspot and the establishment data, the alternatives list including a plurality of list items, each list item corresponding to one of the hot spots that are available on the medium within the previously accessed establishment data;
   sending a first hotspot payoff including the alternatives list to the mobile device for display;
   receiving, via the network, data indicative of a user-selected list item at the mobile device from the displayed alternatives list; and
   sending, via the network, a second hotspot payoff associated with the one of the hotspots that are available on the medium within the previously accessed establishment data and to which the user-selected list item corresponds.

2. The memory resource of claim 1, wherein each hotspot, when detected by a mobile computing device having a camera, a display component, and programming to recognize the hotspot, is to trigger an information display relating to a subject of the medium at the display component.

3. The memory resource of claim 1, wherein each of the plurality of hotspots includes a spatial address relative to the medium, and is linked to a hotspot payoff according to the spatial address.

4. The memory resource of claim 1, wherein the establishment data identifies a user creator for the target hotspot, and the alternatives list is user-searchable at the device to access an additional hotspot created by the user creator.

5. The memory resource of claim 1, wherein the establishment data identifies a creation time for the target hotspot, and the alternatives list is user-searchable at the device to access an additional hotspot that was created within a prescribed period relative to the creation time.

6. The memory resource of claim 1, wherein the establishment data identifies a content type for the target hotspot, and the alternatives list is user-searchable at the device to access an additional hotspot of the content type.

7. The memory resource of claim 1, wherein the processing further comprises updating the alternatives list by modifying a hotspot, or adding an additional hotspot, according to a shared establishment data attribute relative to the target hotspot.

8. The memory resource of claim 1, wherein the processing further comprises updating a user creator for the target hotspot, and to update the alternatives by modifying a hotspot, or adding an additional hotspot, created by the user creator.

9. The memory resource of claim 1, wherein the processing further comprises updating a creation time for the target hotspot, and to update the alternatives list by modifying a hotspot, or adding an additional hotspot, created within a prescribed period relative to the creation time.

10. The memory resource of claim 1, wherein the processing further comprises identifying a content type for the target hotspot, and to update the alternatives list by modifying a hotspot, or adding an additional hotspot, of the content type.

11. The memory resource of claim 1, wherein the hotspots that are available on the medium remain static between accessing the establishment data and determining the alternatives list.

12. The memory resource of claim 11, wherein every list item corresponds to one of the hot spots that are available on the medium within the previously accessed establishment data.

13. The memory resource of claim 1, wherein every list item corresponds to one of the hot spots that are available on the medium within the previously accessed establishment data.

14. A system for enabling media hotspot payoffs with alternatives lists, comprising:
    a processor; and
    a memory storing instructions executable by the processor to:
      send to a hotspot manager device, via a network, presence data indicative of a mobile device's detection of a target hotspot of a plurality of hotspots that are available on a medium;
      receive from the manager device, and cause the mobile device to display, an alternatives list for the target hotspot determined based on identification of the target hotspot and establishment data for the hotspots, the alternatives list including a plurality of list items, each list item corresponding to one of the hot spots that are available on the medium within the establishment data;
      send to the manager device selection data indicative of a user-selected list item at the mobile device from the displayed alternatives list; and
      receive from the manager device, and cause the mobile device to display, a hotspot payoff associated with the one of the hotspots that are available on the medium within the establishment data and to which the user-selected list item corresponds.

15. A method comprising:
    accessing establishment data for a plurality of hotspots that are available on a medium, with each hotspot linked to a hotspot payoff that includes information that is presented responsive to detection of the hotspot;

receiving, via a network, presence data indicative of a mobile device detecting a target hotspot of the hotspots that are available on the medium within the previously accessed establishment data;

determining an alternatives list for the target hotspot based on an identification of the target hotspot and the establishment data, the alternatives list including a plurality of list items, each list item corresponding to one of the hot spots that are available on the medium within the previously accessed establishment data; and sending a first hotspot payoff including the alternatives list to the mobile device for display;

receiving, via the network, data indicative of a user-selected list item at the mobile device from the displayed alternatives list; and sending to the mobile device a second hotspot payoff associated with the one of the hotspots that are available on the medium within the previously accessed establishment data and to which the user-selected list item corresponds.

\* \* \* \* \*